W. S. MOFFAT.
CURTAIN POLE BRACKET.
APPLICATION FILED MAR. 29, 1912.
1,033,440.
Patented July 23, 1912.
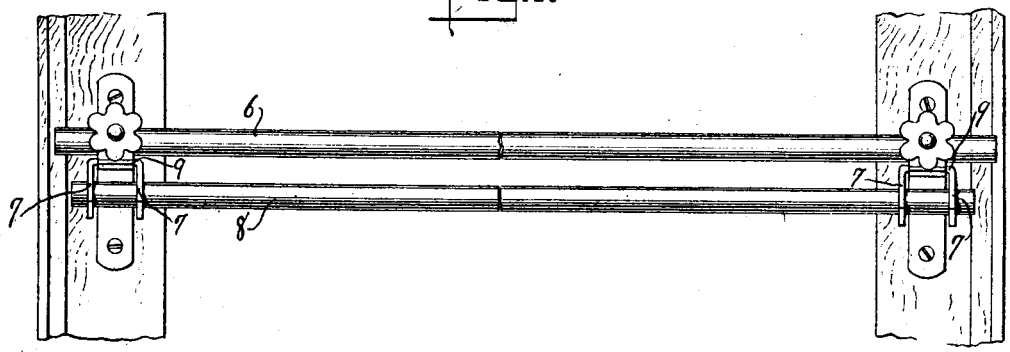
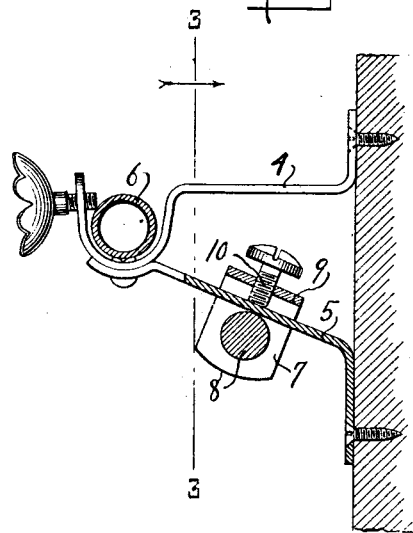
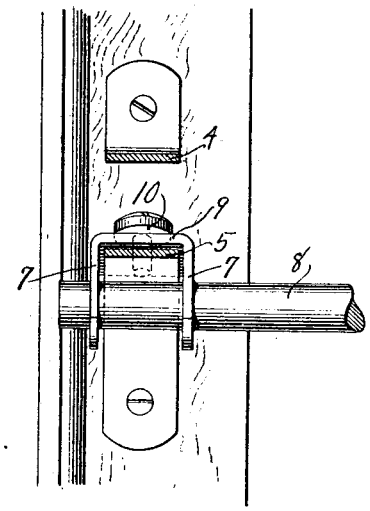
WITNESSES
INVENTOR
William S. Moffat
BY
ATTORNEY

UNITED STATES PATENT OFFICE.

WILLIAM S. MOFFAT, OF PITTSBURGH, PENNSYLVANIA, ASSIGNOR TO BERBECKER & ROWLAND MANUFACTURING COMPANY, OF WATERVILLE, CONNECTICUT, A CORPORATION OF CONNECTICUT.

CURTAIN-POLE BRACKET.

1,033,440.    Specification of Letters Patent.    Patented July 23, 1912.

Application filed March 29, 1912. Serial No. 687,191.

*To all whom it may concern:*

Be it known that I, WILLIAM S. MOFFAT, a citizen of the United States, and a resident of Pittsburgh, in the county of Allegheny and State of Pennsylvania, have made and invented certain new and useful Improvements in Curtain-Pole Brackets, of which the following is a specification.

My invention relates to curtain pole brackets, and more particularly to an auxiliary bracket adapted for use in connection with a bracket proper and whereby to secure or hold in place a second or auxiliary curtain rod in proper position with relation to the rod held in place by the bracket proper.

Heretofore the ordinary form of auxiliary bracket comprised a clamping member for supporting the auxiliary bracket on the bracket proper, a member for receiving and containing the end of the auxiliary curtain pole, a clamping or set screw for retaining the auxiliary bracket in place on the bracket proper, and a set screw for retaining the auxiliary curtain rod in place in its respective member. This form or type of bracket is necessarily an expensive one, and it is the object of my present invention to so construct an article of this kind that the cost thereof will be materially reduced and at the same time be just as neat and attractive in appearance and operate with the same effectiveness as the more expensive one.

With these and other ends in view the invention consists in certain novel features of construction as will be hereinafter fully described and pointed out in the claim.

In the drawing: Figure 1 is a view showing two curtain rods or poles the ends of which are supported by two of my improved brackets: Fig. 2 is a view showing my improved bracket partly in side elevation and partly in section; and Fig. 3 is a view showing a section upon a plane indicated by the line 3—3, Fig. 2.

It will of course be understood that my auxiliary bracket may be used in connection with most any of the forms of curtain pole brackets now in use, the one illustrated in the drawings being of the common or ordinary type and comprises one or more arms, such as 4, 5, extending outwardly from the surface to which the bracket is secured and which bracket is adapted to support a main curtain rod 6 at its outer or free end, the rod being thus supported in front of and at some distance from the window or opening which it spans.

My improved auxiliary bracket includes also a U-shaped clamping member having side arms 7 provided with holes or openings through which an auxiliary curtain rod 8 may extend, and a connecting portion 9 whereby the side arms are connected with one another, and which connecting portion is provided with a threaded opening through which passes a screw 10. The said clamping member is designed to fit over one of the arms 4; 5 aforesaid as shown, from which it follows that when the auxiliary rod is in place, the same may be drawn against one surface of the arm as the screw 10 is forced against the opposite surface thereof, whereby the several parts are drawn and clamped together, and held in whatever position they may be placed.

It will be obvious that the U-shaped clamping member may be adjusted along the arm to which it is secured to thereby vary the position of the auxiliary rod relatively to the main rod, and that the auxiliary rod will be held in its adjusted position and prevented from moving along its axis by the said clamping member. The act of tightening a single screw, therefore, serves to secure the auxiliary rod in its required position and to secure it against axial movement; and, the auxiliary rod being clamped to the bracket as distinguished from being merely supported therefrom, the same serves to strengthen the entire curtain supporting fixture as the brackets upon the sides of the window will be connected with one another or tied together by the auxiliary rod.

From the foregoing it will be understood that my improved device is exceedingly simple in construction, neat and attractive in appearance, and, by reason of the fact that the structure has been much simplified and several parts omitted which have heretofore been necessary in the usual construction of bracket, the cost thereof is materially reduced.

What I claim is:—

A curtain pole bracket having an arm extending outwardly from the surface to which the same is secured, and which bracket is adapted to support a curtain pole at its free end; a U-shaped clamping member supported by and adjustable along the arm aforesaid of the bracket, said clamping member having two side arms and a connecting portion whereby the arms are connected with one another at one end and said arms having each a hole adjacent its free end through which holes an auxiliary curtain rod may extend; and a clamping screw extending through the connecting portion of the clamping member and the end of which is adapted to engage the arm aforesaid of the bracket.

Signed at Pittsburgh, in the county of Allegheny and State of Pennsylvania, this 27 day of March A. D. 1912.

WILLIAM S. MOFFAT.

Witnesses:
EDWARD L. MERRILL,
ALICE A. TRILL.

Copies of this patent may be obtained for five cents each, by addressing the "Commissioner of Patents, Washington, D. C."